United States Patent
Dimitrov et al.

(10) Patent No.: US 9,995,844 B2
(45) Date of Patent: Jun. 12, 2018

(54) METHOD AND SYSTEM FOR GEOPHYSICAL MODELING OF SUBSURFACE VOLUMES

(71) Applicants: Pavel Dimitrov, Houston, TX (US);
Matthias Imhof, Katy, TX (US);
Martin Terrell, Spring, TX (US)

(72) Inventors: Pavel Dimitrov, Houston, TX (US);
Matthias Imhof, Katy, TX (US);
Martin Terrell, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 770 days.

(21) Appl. No.: 14/205,031

(22) Filed: Mar. 11, 2014

(65) Prior Publication Data

US 2014/0278317 A1 Sep. 18, 2014

Related U.S. Application Data

(60) Provisional application No. 61/799,034, filed on Mar. 15, 2013.

(51) Int. Cl.
*G01V 11/00* (2006.01)
(52) U.S. Cl.
CPC .................... *G01V 11/00* (2013.01)
(58) Field of Classification Search
CPC ....................................................... G01V 11/00
See application file for complete search history.

(56) References Cited

U.S. PATENT DOCUMENTS

| | | | |
|---|---|---|---|
| 5,153,858 A | 10/1992 | Hildebrand |
| 5,416,750 A | 5/1995 | Doyen et al. |
| 5,444,619 A | 8/1995 | Hoskins et al. |
| 5,539,704 A | 7/1996 | Doyen et al. |

(Continued)

FOREIGN PATENT DOCUMENTS

| WO | WO 99/64896 | 12/1999 |
|---|---|---|
| WO | WO 2009/137176 | 11/2009 |

OTHER PUBLICATIONS

Zeng, H. et al. (1998), "Stratal slicing, part II. real seismic data," *Geophysics* 63(2), pp. 514-522.

(Continued)

*Primary Examiner* — Kamini S Shah
*Assistant Examiner* — Steven W Crabb
(74) *Attorney, Agent, or Firm* — ExxonMobil Upstream Research Company—Law Department

(57) ABSTRACT

Method and system are described for modeling one or more geophysical properties of a subsurface volume (102). The present disclosure provides method of modeling the subsurface comprising obtaining one or more subsurface volumes and performing at least two operations (104) on the subsurface volumes. A graph of operations is determined (106) based on each of the at least two operations in which the graph of operations includes a description of each of the at least two operations and a flow path for the each of the at least two operations (108). The graph of operation is stored (110). A specific operation within the graph of operations may then be identified (112). An additional operation may be created and connected to the graph of operations at a node associated with the specific operation to provide an additional branch to the graph of operations (114).

26 Claims, 7 Drawing Sheets

(56) References Cited

U.S. PATENT DOCUMENTS

| | | |
|---|---|---|
| 5,586,082 A | 12/1996 | Anderson et al. |
| 5,677,893 A | 10/1997 | de Hoop et al. |
| 5,852,588 A | 12/1998 | de Hoop et al. |
| 5,940,777 A | 8/1999 | Keskes |
| 6,052,650 A | 4/2000 | Assa et al. |
| 6,128,577 A | 10/2000 | Assa et al. |
| 6,226,596 B1 | 5/2001 | Gao |
| 6,236,942 B1 | 5/2001 | Bush |
| 6,295,504 B1 | 9/2001 | Ye et al. |
| 6,411,903 B2 | 6/2002 | Bush |
| 6,493,635 B1 | 12/2002 | Bevc et al. |
| 6,574,565 B1 | 6/2003 | Bush |
| 6,618,678 B1 | 9/2003 | Van Riel |
| 6,625,541 B1 | 9/2003 | Shenoy et al. |
| 6,725,163 B1 | 4/2004 | Trappe et al. |
| 6,735,526 B1 | 5/2004 | Meldahl et al. |
| 6,754,380 B1 | 6/2004 | Suzuki et al. |
| 6,754,589 B2 | 6/2004 | Bush |
| 6,757,614 B2 | 6/2004 | Pepper et al. |
| 6,771,800 B2 | 8/2004 | Keskes et al. |
| 6,801,858 B2 | 10/2004 | Nivlet et al. |
| 6,804,609 B1 | 10/2004 | Brumbaugh |
| 6,847,895 B2 | 1/2005 | Nivlet et al. |
| 6,882,997 B1 | 4/2005 | Zhang et al. |
| 6,941,228 B2 | 9/2005 | Toelle |
| 6,950,796 B2 | 9/2005 | Sonneland et al. |
| 6,957,146 B1 | 10/2005 | Taner et al. |
| 6,970,397 B2 | 11/2005 | Castagna et al. |
| 6,988,038 B2 | 1/2006 | Trappe et al. |
| 7,006,085 B1 | 2/2006 | Acosta et al. |
| 7,092,824 B2 | 8/2006 | Favret et al. |
| 7,098,908 B2 | 8/2006 | Acosta et al. |
| 7,206,782 B1 | 4/2007 | Padgett |
| 7,222,023 B2 | 5/2007 | Laurenet et al. |
| 7,243,029 B2 | 7/2007 | Lichman et al. |
| 7,248,258 B2 | 7/2007 | Acosta et al. |
| 7,248,539 B2 | 7/2007 | Borgos et al. |
| 7,266,041 B1 | 9/2007 | Padgett |
| 7,203,342 B2 | 10/2007 | Pederson |
| 7,295,930 B2 | 11/2007 | Dulac et al. |
| 7,453,766 B1 | 11/2008 | Padgett |
| 7,453,767 B1 | 11/2008 | Padgett |
| 7,463,552 B1 | 12/2008 | Padgett |
| 7,502,026 B2 | 3/2009 | Acosta et al. |
| 7,519,476 B1 | 4/2009 | Tnacheri et al. |
| 7,697,373 B1 | 4/2010 | Padgett |
| 7,881,501 B2 | 2/2011 | Pinnegar et al. |
| 8,010,294 B2 | 8/2011 | Dorn et al. |
| 8,027,517 B2 | 9/2011 | Gauthier et al. |
| 8,055,026 B2 | 11/2011 | Pedersen |
| 8,065,088 B2 | 11/2011 | Dorn et al. |
| 8,121,969 B2 | 2/2012 | Chan et al. |
| 8,219,322 B2 | 7/2012 | Monsen et al. |
| 8,326,542 B2 | 12/2012 | Chevion et al. |
| 8,346,695 B2 | 1/2013 | Peper et al. |
| 8,358,561 B2 | 1/2013 | Kelly et al. |
| 8,363,959 B2 | 1/2013 | Boiman et al. |
| 8,380,435 B2 | 2/2013 | Kumaran et al. |
| 8,385,603 B2 | 2/2013 | Beucher et al. |
| 8,463,551 B2 | 6/2013 | Aarre |
| 8,515,678 B2 | 8/2013 | Pepper et al. |
| 9,128,693 B2 * | 9/2015 | Reid .................. G06F 8/30 |
| 2004/0068375 A1 * | 4/2004 | Cook ............. A61B 5/04012 702/11 |
| 2004/0268338 A1 * | 12/2004 | Gurpinar .............. G06Q 10/06 717/169 |
| 2007/0011668 A1 * | 1/2007 | Wholey ................ G06F 8/34 717/151 |
| 2007/0106633 A1 * | 5/2007 | Reiner ................ G06F 19/321 |
| 2008/0123469 A1 | 5/2008 | Wibaux et al. |
| 2008/0270033 A1 | 10/2008 | Wiley et al. |
| 2009/0043507 A1 * | 2/2009 | Dommisse ............. G01V 1/34 702/6 |
| 2009/0089028 A1 * | 4/2009 | Sagert .................. E21B 47/00 703/6 |
| 2009/0119493 A1 * | 5/2009 | Venkitachalam ... G06F 11/3636 712/238 |
| 2009/0164182 A1 | 6/2009 | Pedersen |
| 2010/0174489 A1 | 7/2010 | Bryant et al. |
| 2010/0211363 A1 | 8/2010 | Dorn et al. |
| 2010/0212909 A1 | 8/2010 | Baumstein et al. |
| 2010/0245347 A1 | 9/2010 | Dorn et al. |
| 2011/0018985 A1 | 1/2011 | Zhu |
| 2011/0022435 A1 * | 1/2011 | Reid .................. G06F 8/30 705/7.27 |
| 2011/0048731 A1 | 3/2011 | Gillard et al. |
| 2011/0307178 A1 * | 12/2011 | Hoekstra .............. G01V 1/28 702/5 |
| 2012/0072116 A1 | 3/2012 | Dorn et al. |
| 2012/0090001 A1 | 4/2012 | Yen |
| 2012/0117124 A1 | 5/2012 | Bruaset et al. |
| 2012/0150447 A1 | 6/2012 | Van Hoek et al. |
| 2012/0195165 A1 | 8/2012 | Vu et al. |
| 2012/0197530 A1 | 8/2012 | Posamentier et al. |
| 2012/0197531 A1 | 8/2012 | Posamentier et al. |
| 2012/0197532 A1 | 8/2012 | Posamentier et al. |
| 2012/0197613 A1 | 8/2012 | Vu et al. |
| 2012/0257796 A1 | 10/2012 | Henderson et al. |
| 2012/0322037 A1 | 12/2012 | Raglin |
| 2013/0006591 A1 | 1/2013 | Pyrcz et al. |
| 2013/0138350 A1 | 5/2013 | Thachaparambil et al. |
| 2013/0144571 A1 | 6/2013 | Pepper et al. |
| 2013/0158877 A1 | 6/2013 | Bakke et al. |
| 2013/0235400 A1 * | 9/2013 | Conlon ................ G06K 15/16 358/1.12 |
| 2013/0338984 A1 * | 12/2013 | Braaksma ............. G01V 1/345 703/10 |

OTHER PUBLICATIONS

"Petrel Seismc Interpretation," Schumberger Ltd., 1 pg.
(2010), "Modeling While Intrepreting: From Seismic Interpretation to Robust Reservoir Model," Paradigm, 2 pgs.
U.S. Appl. No. 61/740,352, filed Dec. 20, 2012, Dimitrov.
U.S. Appl. No. 61/740,353, filed Dec. 20, 2012, Dimitrov et al.
U.S. Appl. No. 61/740,354, filed Dec. 20, 2012, Dimitrov et al.
U.S. Appl. No. 61/740,358, filed Dec. 20, 2012, Dimitrov et al.
PCT/US2014/023679—International Search Report and Written Opinion; dated Jul. 10, 2014; 10 pages.

* cited by examiner

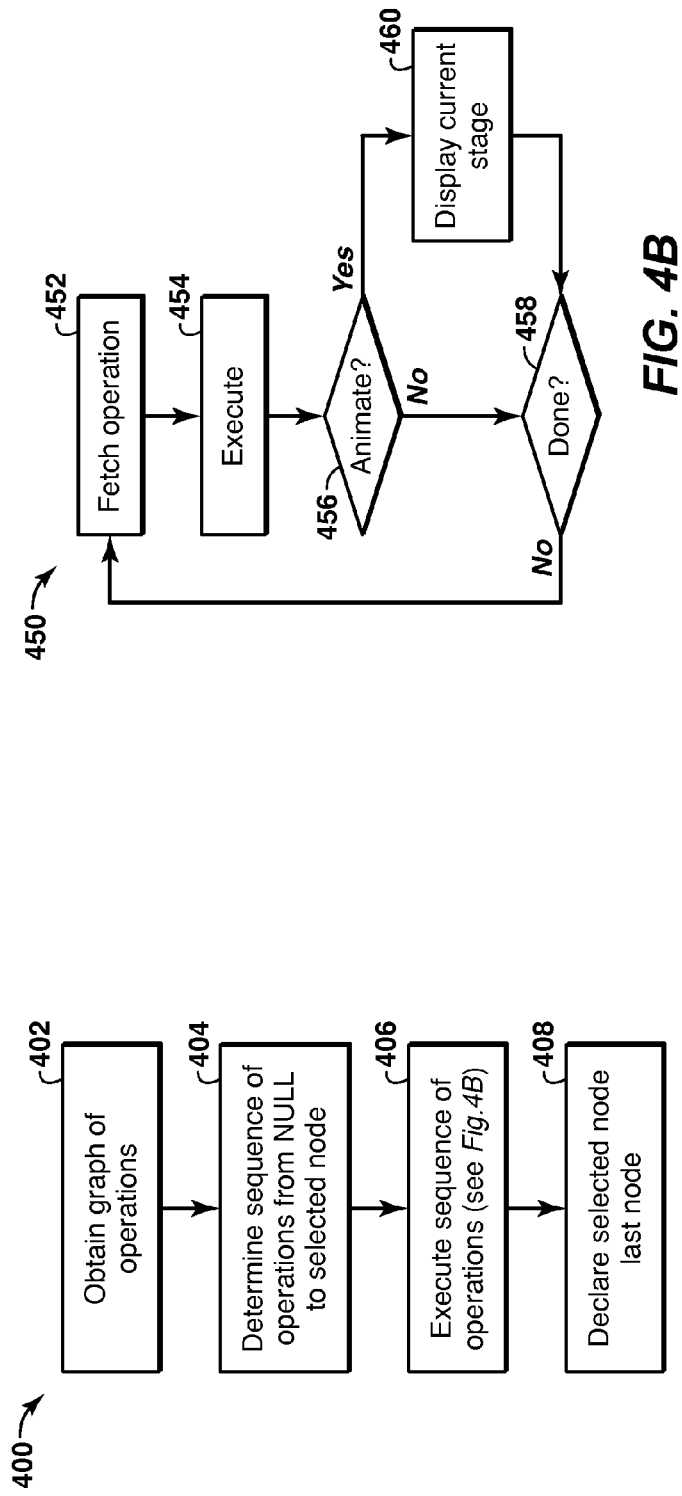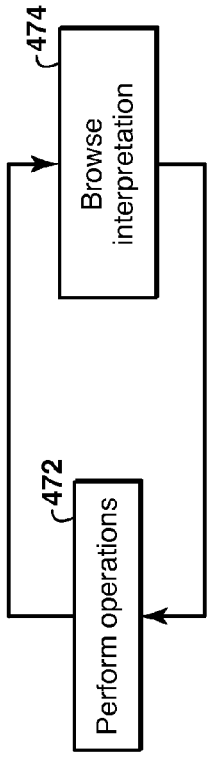

METHOD AND SYSTEM FOR GEOPHYSICAL MODELING OF SUBSURFACE VOLUMES

CROSS-REFERENCE TO RELATED APPLICATION

This application claims the benefit of U.S. Provisional Patent Application 61/799,034, filed Mar. 15, 2013, entitled Method and System for Geophysical Modeling of Subsurface Volumes, the entirety of which is incorporated by reference herein. This application is also related to PCT Serial No. PCT/US2014/17504, filed Feb. 20, 2014, which claims priority to U.S. Provisional Ser. No. 61/799,000, filed Mar. 15, 2013, which are incorporated by reference herein in their entirety.

FIELD OF THE INVENTION

This invention relates generally to the field of prospecting and more particularly to data processing. Specifically, the invention is a method for modeling subsurface volumes for one or more geophysical properties in an enhanced manner.

BACKGROUND OF THE INVENTION

In the oil and gas industry, modeling of the subsurface is typically utilized for visualization and to assist with analyzing the subsurface volume for potential locations for hydrocarbon resources. Accordingly, various methods exist for estimating the geophysical properties of the subsurface volume (e.g., information in the model domain) by analyzing the recorded measurements from receivers (e.g., information in the data domain) provided that these measured data travel from a source, then penetrate the subsurface volume represented by a subsurface model in model domain, and eventually arrive at the receivers. The measured data carries some information of the geophysical properties that may be utilized to generate the subsurface model.

Traditional interpretation systems in the geosciences are product oriented instead of process oriented. The interpreter typically loads some data for a hard disk, performs an interpretation process on this data, and stores the result on disk. What are stored are the outputs or products that may become inputs for later interpretation step or processes. After lengthy manual interpretation steps, the detailed relations between different products are not captured. At times, even the provenance of a product may not be captured, which may be a result of inconsistencies between products. Accordingly, to prevent the loss of valuable information, the data is accumulated instead of being deleted. Further, one or more interpreters may repeat the same interpretation step because an underlying input changed or details were not captured. That is, conventional interpretation processes are not efficient.

As an example, an interpreter may select a horizon in a manual, assisted or automated manner for a typical seismic interpretation system. Depending on horizon prominence and data quality, the interpreter may spend a few minutes to one or more weeks on one horizon. Then, the interpreter picks a second and a third horizon, which may involve similar time periods for analysis. While picking the third horizon, the interpreter may encounter an issue where the third horizon intersects the second one. Clearly, this intersection violates expectations or the law of stratigraphic superposition. At this point, the interpreter has to determine whether the problem is with the second horizon or third horizon and attempts to correct the situation by editing and reinterpreting the horizons in a manual or computer-assisted manner. However, the editing may result in intersections with other horizons. In conventional interpretation systems, numerous interpretation objects, such as surfaces or faults, are generated and stored independently from each other. These inconsistencies between the interpretation objects may remain undetected and cascade through multiple interpretation products until identified, which may require determining the root cause of the inconsistencies and/or recreating the interpretation products.

These problems are further evident in seismic interpretation systems that involve pattern recognition techniques. Typically, interpreters learn about certain patterns, which are used along with experience to identify patterns in the measurement data. Yet, the nature of many patterns do not become concrete or formal enough to be identified and recorded and, as a result, experience is not captured. This also hinders the building of an automated pattern recognition system, as there is no natural language in which to exchange information on appropriate levels of abstraction. There is a gap between the descriptions provided by experienced interpreters and the descriptions required to instruct a computer.

As the recovery of natural resources, such as hydrocarbons rely, in part, on a subsurface model, a need exists to enhance subsurface models of one or more geophysical properties. In particular, a need exists to enhance the interpretation system that is not based on manipulations of static interpretation objects, but rather links interpretation steps and interpretation objects in a dynamic manner where each modification propagates through the interpretation.

SUMMARY OF THE INVENTION

Described with reference to the flow chart of FIG. 5, one embodiment of the present disclosure is a method of modeling the subsurface comprising: (a) obtaining one or more subsurface volumes (502); (b) performing at least two operations on the subsurface volumes (504); (c) determining a graph of operations based on each of the at least two operations (506), wherein the graph of operations includes a description of each of the at least two operations and a flow path for the each of the at least two operations (508); (d) storing the graph of operations (510), wherein the graph of operations is stored in memory where the description for the operation is a node and the flow path between two nodes is an edge; (e) identifying a specific operation in the graph of operations (512); and (f) creating an additional operation connected to the graph of operations at a node associated with the specific operation to provide an additional branch to the graph of operations (514).

The foregoing has broadly outlined the features of one embodiment of the present disclosure in order that the detailed description that follows may be better understood. Additional features and embodiments will also be described herein.

BRIEF DESCRIPTION OF THE DRAWINGS

The foregoing and other advantages of the present disclosure may become apparent upon reviewing the following detailed description and drawings of non-limiting examples of embodiments.

FIGS. 4A to 4C are flow charts of user interactions with the graph of operations in accordance with an exemplary embodiment of the present techniques.

DETAILED DESCRIPTION OF THE PREFERRED EMBODIMENTS

Figure 1A:
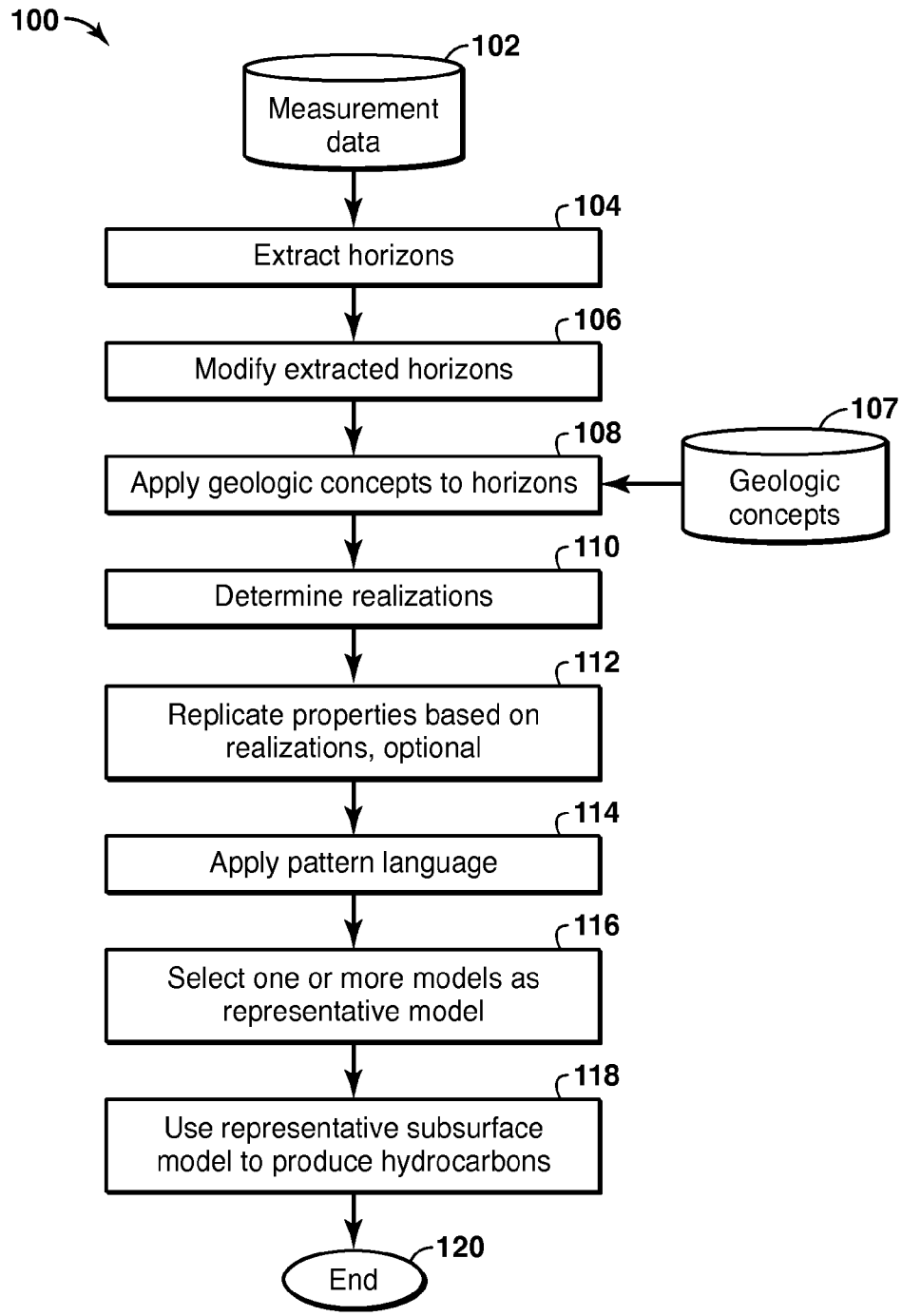
FIGS. 1A and 1B are flow charts for generating a subsurface model in accordance with certain methods described herein.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent. Further, various terms and reference characters that are the same are utilized in the equations and associated description within the disclosure.

The present disclosure describes methods and systems to enhance subsurface models. In particular, the present techniques involve interpreting and analyzing geophysical and geological data using a computer. Unlike current methodology which primarily focuses on obtaining products (e.g., horizons from seismic data, attributes, etc.), the present techniques involve the transformations that obtain those products. Accordingly, the present techniques describe mechanisms to organize the computational steps in a coherent manner that is both flexible and compact.

The present techniques provide various enhancements over other methods. For example, the present techniques track interpretation operations, which include computational and user-guided operations. By tracking the interpretation operations, work can be reproduced exactly step by step, including all intermediate stages. This feature may also provide a mechanism for users to extend or divert from an existing interpretation from any stage, including interpretations created by other users. In addition, portions of an existing interpretation may be utilized as "templates" applied to other interpretation sessions. This feature also provides a mechanism for data mining algorithms to learn from human operators.

Further, the present techniques provide access to multiple users to the same data set and available interpretations, including those created by other users; various stages of interpretations may be available including abandoned leads or concepts. Joint interpretation of different data sets, including multiple types of data with multiple characteristics may also be provided by this functionality.

Also, the present techniques may provide a mechanism to annotate work as well as data. The documenting of the interpretation sessions may include different levels of detail based on the user's discretion. The documentation may include user-selected levels of detail while browsing through an existing interpretation In addition to the above features, the present techniques may provide for an automatic optimization of the computation process that leads to the creation of a product. This may also include the creation, manipulation and evaluation of multiple interpretation scenarios.

The present techniques may combine different features to form an interpretation system. The process may involve a user loading seismic data. Then, various calculations may be performed, such as computing dip estimates, calculating horizons, or computing stacks of surfaces. The user may then review and/or document the data, such as browsing the data on a cross section of the volume: the user moves the cursor over the data and the surface corresponding to the cursor location follows the movement in real time; marking the location and current surface; and/or identifying and/or correcting surfaces by providing alternative surfaces in a small region or by connecting two points together. If the user wants to identify patterns in the data, the system may utilize a pattern finding operation. Each of these various steps may be performed in operations, such as loading the data, computing vectors, selecting surfaces, updating surfaces and fault, etc., which are stored in memory. These operations may be stored as a graph of operations. The operations may be tracked to recover the state of an earlier step in the interpretation.

In one or more embodiments, an interpretation system is provided that is not based on manipulations of static interpretation objects, but links interpretation steps and interpretation objects in a dynamic manner, such that modifications may propagate through the data associated with the interpretation. As a result, modifying one object (e.g., a surface) may automatically perturb neighboring objects associated with it and/or subsequent objects. The interpretation system of the present techniques shifts the focus from static interpretation products onto the transformations that relate different products. In one exemplary embodiment, objects, such as surfaces, in an interpretation may be represented in a global manner, instead of being represented as independent objects. Accordingly, instead of manipulating each surface independently, the inventive system may modify or transform the underlying global representation for the objects and thus perturbing multiple objects at once. In some cases, the inventive system may perturb all objects of a given type by modifying their underlying global representation.

As an example, in one or more embodiments, a pattern language may specify using a special type of operation or feature called a pattern. That is, a pattern may be a compound operation, in that it may consist of a sequence of operations, which does not involve user interaction during execution. Independent of all past, present, and future manipulations, perturbations, and transformations applied to the data, the data may be queried against the pattern. To further describe the present techniques, various aspects are described further in FIGS. 1 to 5.

Figure 1B:
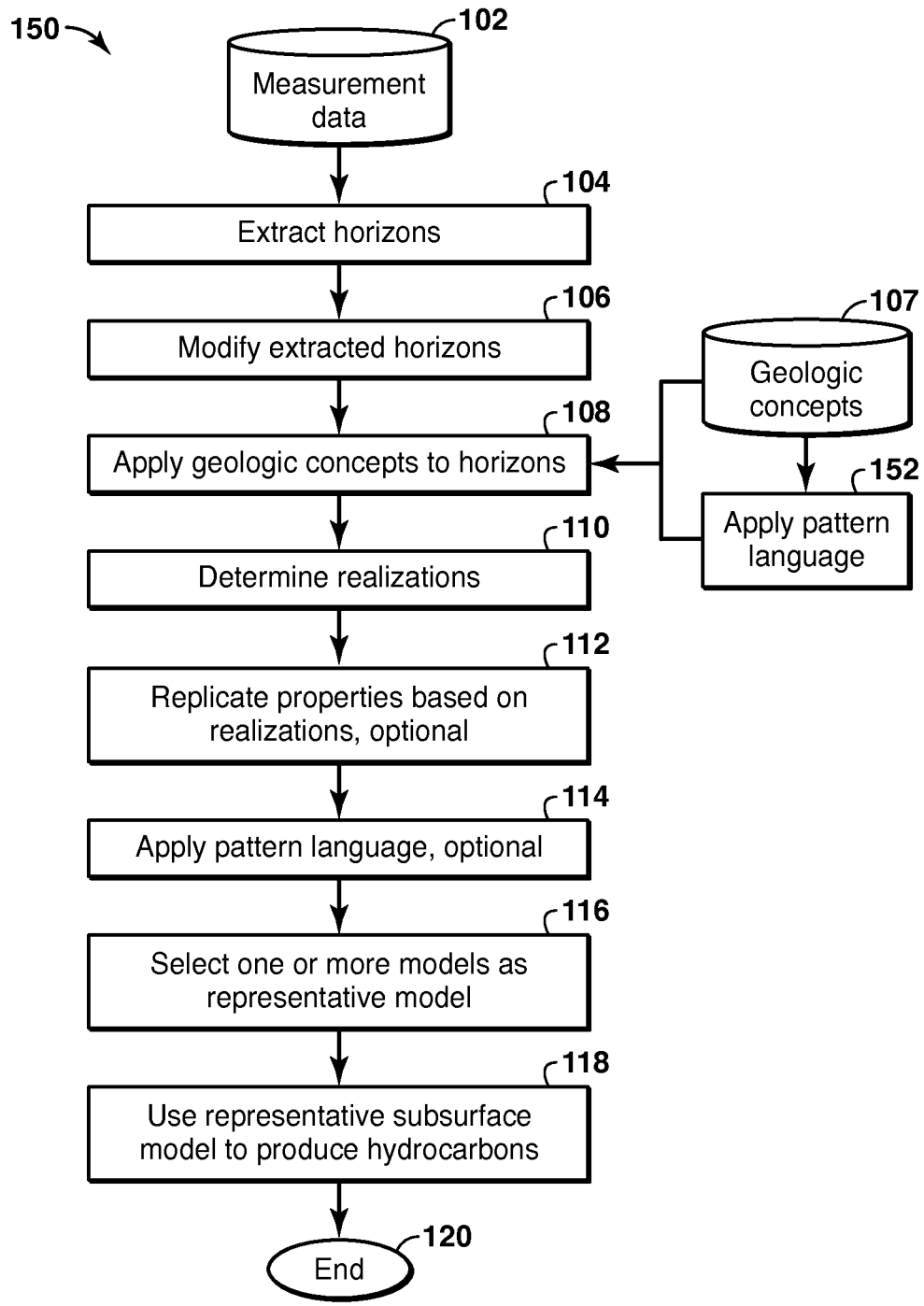

Certain embodiments of the present techniques may be implemented as a method, as described in the exemplary embodiments of flow charts in FIGS. 1A and 1B. FIG. 1A is a flow chart 100 for generating a subsurface model in accordance with an exemplary embodiment of the present techniques. As noted above, this flow chart 100 includes a data preparation stage, which includes blocks 102, 104 and 106, and an interpretation stage, which includes blocks 108 to 116. Further, the resulting subsurface model may be utilized to produce hydrocarbons as shown in block 118 and the process may be completed in block 120.

The process begins with the data preparation stage, which involves constructing data volumes from the measurement data, as shown in blocks 102 to 106. The measurement data are obtained in block 102. The measurement data may be obtained by performing a seismic survey (e.g., forming seismic waves with a source, recording the received signals related to the source at one or more receivers, and processing received data to form measurement data). The measurement data may include surface seismic data, check-shot seismic data, etc. Also, the measurement data may include controlled source electromagnetic data, microseismic and/or other types of measured data. Each of these different surveys may be performed in a manner known to those skilled in the art. This measurement data may be subjected to various processing steps to remove noise and/or other filtering to refine the measurement data. With the measurement data, horizons are extracted in block 104 The extraction of horizons may include constructing a data volume set based on the measurement data (e.g., measurement data used to populate the different nodes or cells within the data volume set or subsurface model), optionally performing label propagation, forming a stack of surfaces and extracting horizons from the measurement data, stack of surface, and/or data derived from the measurement data. The method may include performing vector calculations from measurement data (e.g., seismic data). As an example, the horizon extraction may include the techniques described in U.S. Patent Application Ser. Nos. 61/740,358; 61/740,352; 61/740,353; and 61/740,354, which are each hereby incorporated by reference herein. The measurement data may include data volumes, such as an image and/or a property volume of one or more geophysical properties, such as density, porosity, seismic velocity ($v_s$), pressure velocity ($v_p$), fluid saturation, and the like. The data volume may include any number of volumes and may include one or more attribute volumes, instantaneous phase volumes, amplitude volumes, other attribute volumes, and any combination of such volumes. At block 106, the extracted horizons may be modified. The modification of the extracted horizons may include modifying the number of horizons within the model.

Once the horizons are extracted, the interpretation stage, which includes blocks 108 to 116, may be performed. The interpretation stage begins by applying the geologic concepts to the horizons, as noted in block 108. The geologic concepts, as noted in block 107, may include stacking patterns (e.g., how surfaces (horizons) of different types interact when they meet (truncation modalities)). Another type of geologic concept may involve the interpolation operation for missing surfaces (e.g., proportionally, top-conformal, base-conformal, etc.). These types of concepts are the result of human interpretation, but the system uses the information to facilitate the application of the concepts (e.g., to build a geologic framework). Applying the geologic concepts is discussed further in FIG. 7 below. Then, at block 110, one or more realizations are determined. Then, properties may be assigned or replicated based on one or more of the realizations, as shown in block 112. Then, the pattern language may be applied to the realizations or replicated properties, as shown in block 114. The application of the pattern language may include performing a pattern search on geometry or attributes, for example. Once the pattern language has been applied, one or more models may be selected as a representative model, as shown in block 116. The selection of the one or more models may include determining which of the models satisfies a cost function or may be performed as a manual task whereby the human interpreter makes a decision.

Once the interpretation stage is complete, the representative models may be utilized to produce hydrocarbons, as noted in block 118. The subsurface model may be utilized in hydrocarbon management activities to determine locations of resources, access the resources and produce hydrocarbons in a manner known to those skilled in the art. Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. In one embodiment, the disclosed methodologies and techniques may be used to extract hydrocarbons from a subsurface region. In such an embodiment, inputs are received from a subsurface model of the subsurface region, where a geologic model has been enhanced or created using the methods and aspects disclosed herein. Based at least in part on the representative subsurface model, the presence and/or location of hydrocarbons in the subsurface region are predicted. Hydrocarbon extraction may then be conducted to remove hydrocarbons from the subsurface region, which may be accomplished by drilling a well using oil drilling equipment. The equipment and techniques used to drill a well and/or extract the hydrocarbons are well known by those skilled in the relevant art. Other hydrocarbon extraction activities and, more generally, other hydrocarbon management activities, may be performed according to known principles. The process ends at block 120.

Beneficially, the multiple scenarios provide flexibility, such that various scenarios may involve a number much larger than currently possible because automated tools track scenarios. These may even create other scenarios and provide for quick application of pointed modifications that may need to be propagated through a complex model. Further, the quick scenario creation and evaluation, either by hand or in some automated manner is facilitated by the pattern language tools. Further, the application of geologic concepts and flexibility in determining which concepts to use and how to add new ones provides an enhancement in modeling analysis. Also, the present techniques may involve sharing information among geoscientists, reproducibility of results, and general documentation.

FIG. 1B is a flow chart 150 for generating a subsurface model in accordance with another exemplary embodiment of the present techniques. As noted above, this flow chart 100 includes a data preparation stage, which includes blocks 102, 104 and 106, and an interpretation stage, which includes blocks 108 to 116. Further, the resulting subsurface model may be utilized to produce hydrocarbons as shown in block 118 and the process may be completed in block 120. In this embodiment, the pattern language may be used to specify geologic concepts, as shown in block 152. Beneficially, it allows the specification of geologic concepts, as such additional concepts become available. In other words, the human interpreter may elect to add (or remove) geologic concepts by describing them using the pattern language.

Figure 7:
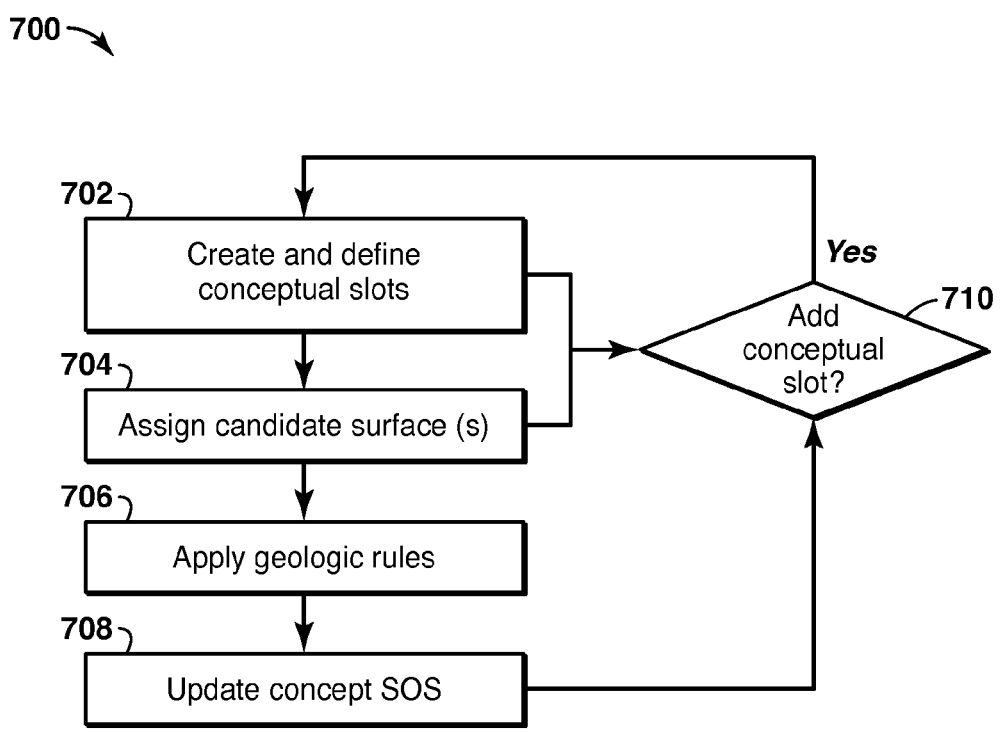
FIG. 7 is a flow chart for managing concepts in accordance with certain disclosures made herein.

While the geologic concepts may be managed through different methods, FIG. 7 is an exemplary flow chart in accordance with an embodiment of the present techniques. In this flow chart 700, the application of the geologic concepts, as noted in block 108, may include various stages of a conceptual framework manager.

At block 702, the conceptual slots are created and defined. The creation of the conceptual slots may include defining a tag or type for the slot—the conceptual horizon—a location of the slot relative to other slots. The definition of the conceptual slots may include assigning any properties that are independent of the horizon's geometry like a name, confidence, stratigraphic description, etc. Then, at block 704, candidate surfaces are assigned. The assignment of candidate surfaces may include assigning a geometric object that describes a horizon top to the slot, including making multiple such assignments and storing each one of them. The geometric object may be a reference or the explicit geometry (e.g., points and their coordinates). Then, at block 706, the geologic rules are applied. The application of the geologic rules may include truncating the selected candidates from the various conceptual slots according to the types of surfaces defined by the slot's description (e.g., an unconformity truncates a conformable surface). Then, the concept stack of surfaces (SOS) may be updated in block 708. The updating may include removing surfaces from the SOS, adding new surfaces, substituting surfaces, permuting surfaces, modifying the values for existing surfaces, changing their types, or combination thereof.

At block 710 a determination is made whether a conceptual slot should be added. This is a decision by a human interpreter or a computer interpreter. In either case, the decision pertains to what is expected from the data.

If a conceptual slot is to be added, then the process may proceed to block 702. However, if the conceptual slot is not to be added, the process may terminate or other processes may be engaged instead (like interpretation of additional candidates for existing slots).

Beneficially, this process may be utilized to enhance the model construction process. Creating a geologic framework—i.e. sets of horizons with geologic significance—is greatly facilitated by this flow because many of the otherwise manual tasks are being performed by the computer. The geologic rules, in particular, are also enforced by the system, thereby improving the consistency of the final interpretation product (the geologic framework).

To enhance the operation of the method, the modeling of subsurface volumes for one or more geophysical properties may include graph of operations techniques. The graph of operations may be utilized to track various operations during an interpretation session. As an example, the graph of operations may be utilized in conjunction with blocks 106 to 116 to manage the functionalities provided in these blocks.

Figure 2:
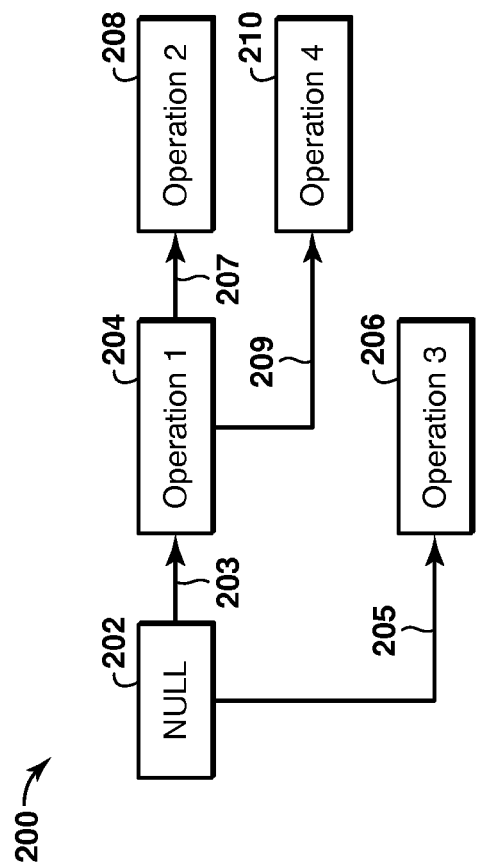
FIG. 2 is a flow chart for the graph of operations in accordance with an exemplary embodiment of the present techniques.
Figure 5:
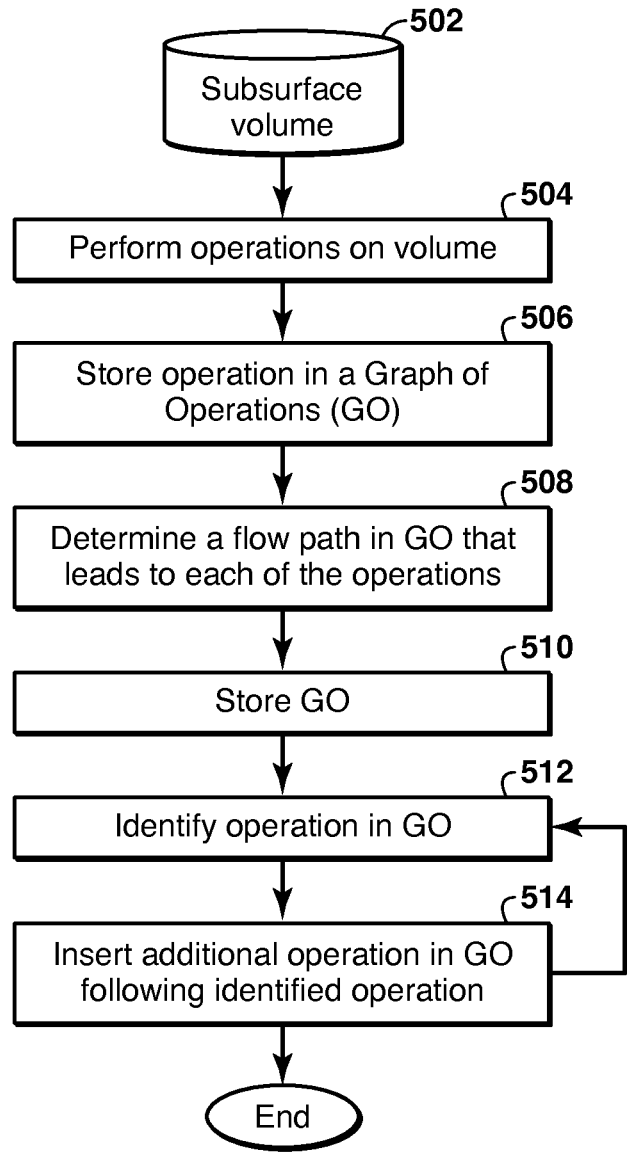
FIG. 5 is a flow chart showing basic steps in one embodiment of the present invention.

While the geologic concepts may be managed through different methods, FIG. 2 is an exemplary flow chart in accordance with an embodiment of the present techniques. In this flow chart 200, the modeling of subsurface volumes for one or more geophysical properties may utilize graph of operations to further enhance the process. The graph of operations may be utilized to keep track of various operations during an interpretations session.

In this flow chart 200, a combinatorial structure (e.g., a type of directed graph) is shown that includes a set of nodes 202, 204, 206, 208 and 210 (e.g., each associated with an operation) and a set of edges 203, 205, 207 and 209 that describe how the nodes 202, 204, 206, 208 and 210 are connected to one another. In the flow chart 200, the nodes 202, 204, 206, 208 and 210 are operations and the edges 203, 205, 207 and 209 may exist if and only if one operation may be performed following another one. For example, the edge 207 means that a second operation 208 may be performed after a first operation 204, and the existence of the edge 207 means that both operations 204 and 208 were performed in this specific order. When an interpretation session is initiated, a special node referred to as NULL is the starting point. The first operation 204 is then added to the graph of operations and the edge 203 as well. The performance of the graph of operation is further explained in FIGS. 3 to 5.

Beneficially, this process may be utilized to enhance the model construction process. In particular, any work performed by a human interpreter or an automated process, may be reproduced partially or completely. The present techniques may provide a mechanism for storing this information in a particularly compact manner using a graph of operations (operations versus products stored). Further, the present techniques may include additional data mining techniques that may be applied later to the data contained in a graph of operations to further facilitate the interpretation process.

Further, the graph of operations may be displayed to the user to facilitate interaction with user. The nodes and information associated with the graph of operations may be visually communicated in a graphical manner, which may be presented as provided in FIG. 2. This may further facilitate interaction between a user and the interpretation session.

As an example, one or more embodiments may selectively display information from the graph of operations at the request of the user. The graphical image presented does not have to provide the complete structure of the graph of operations, as some nodes may merely include information. To avoid clutter, the graphical image of the graph of operations may include only the information relevant to certain operations. In particular, the name of the current node may be the only information displayed. Also, for multiple scenarios, only named scenarios may appear in a graphical representation. Each scenario may correspond to a directed path in the graph of operations. These paths may also follow a graph structure, such as paths leading to the NULL node, but some paths may be coupled at another location, so a relative connectivity may be computed. As an example, a first scenario S1 may be connected to a second scenario S2 if and only if the path of the first scenario S1 shares the longest sub-path with the path of the second scenario S2. The graphical representation may only present the induced connectivity rather than the complete structure of the graph of operations. This representation may simplify the presented representation and simplify browsing through the various scenarios.

During the creation of additional scenarios, other information may be important. The sub-structure of the graph of operations that corresponds to the operations that modify the data may be the relevant aspect. For example, a user may decide to reuse a certain sequence of such operations. The system may then display the appropriate sub-structure and provide the user with a selection of paths to mix and match.

Figure 3:
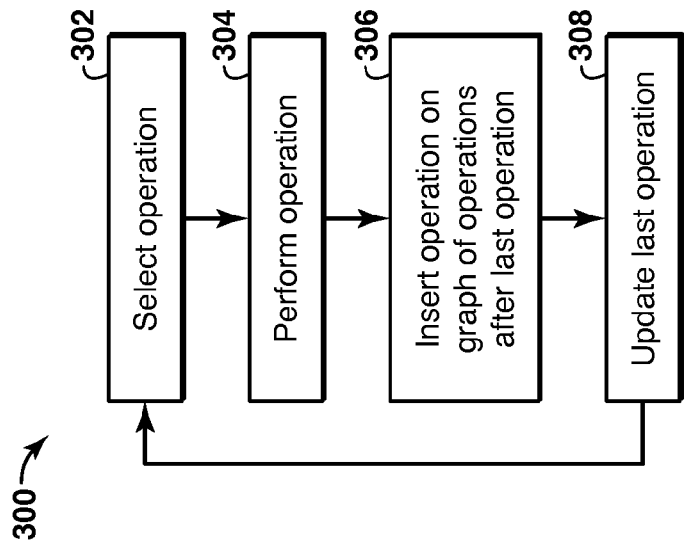
FIG. 3 is a flow chart for performing the graph of operations in accordance with an exemplary embodiment of the present techniques.

FIG. 3 is a flow chart for performing the graph of operations in accordance with an exemplary embodiment of the present techniques. This flow chart 300 is an example of temporal tracking of interpretation work in accordance with the present techniques. In this flow chart 300, user interactions with the interpretation system are tracked. Specifically, a user selects an operation, as shown in block 302. Then, the system may perform the operation, as shown in block 304. Once the operation is performed, the operation may be inserted into a graph of operations after the last operation, as shown in block 306. The insertion may include storing the operation in memory as part of a listing or a table, or storing in memory a tracking tag or associated memory location. Then, the last operation is updated, as shown in block 308. The updating of the last operation may include storing an identification tag associated with the inserted operation or suitable mechanism for tracking the last operation in the graph of operations. Then, the process may repeat for additional operations in block 302; see also 514→512 in FIG. 5. The graph of operations for operations performed on a data set may be stored and associated with the subsurface model, the measurement data or another interpretation.

Beneficially, tracking interpretation operations provides a mechanism to reproduce operations performed in an interpretation. In this manner, any user may be able to begin an interpretation at any of the steps in the graph of operations for that interpretation. That is, users may extend or divert from an existing interpretation from any operation, including interpretations created by other users. This functionality provides a mechanism to use operations of existing interpretation as "templates" applied to other interpretation sessions.

As an example, an edge (under the above constraint) may be created each time a valid operation is performed. When an interpretation session is initiated, a special node referred to as NULL is the starting point (e.g., operation 202 of FIG. 2). Once the first operation 204 is performed, it is added to the graph of operations and the edge 203 is also added to the graph of operation. Then, if the current node in the graph of operations is the first operation (e.g., first operation 204 of FIG. 2), the next operation performed may be associated with a second operation (e.g., second operation 208 of FIG. 2). The second operation may result in a node being created after a second operation is preformed and an edge is created for that node (e.g., edge 207 of FIG. 2).

As another feature, the graph of operations may provide a mechanism to reproduce interpretations. That is, the current stage of an interpretation session is the result of applying some sequence of operations. Each of these operations are stored in the graph of operations and such sequences may be extracted directly from the graph of operations. Thus, any user, which may also include an automated program or set of instructions, may call an operation of an interpretation session if it understands how to obtain the appropriate sequence of operations.

While several options are available to perform the reproduction function, in one embodiment of the present techniques, the graph of operations may be a directed tree, such as provided in the examples of FIG. 2. In this manner, a user may provide a single node (e.g., an operation). Then, the unique directed path from the NULL node to the node associated with the specified operation may be extracted using a graph traversal method. As provided above in FIG. 2, the path may include an ordered sequence of nodes, such that an edge exists between every pair of consecutive nodes, is the appropriate sequence of operations, which describe a stage of an interpretation session. Therefore, in this embodiment, each node in the graph of operations represents a stage in the interpretation process.

In another embodiment of the present techniques, the graph of operations is not a tree, which may involve more than one path between the NULL node and some other node in the graph of operations. In this example, the path has to be provided explicitly to reproduce a stage in the interpretation process. Thus, the full sequence of operations (e.g., the complete directed path, rather than a single node) describes the stage. This embodiment may be less efficient than the tree structure in terms of compactness of the representation of the outcome, but it may be more efficient in terms of the size of the graph of operations.

In other embodiments of the present techniques, the graph of operations is represented as a tree structure, a simple graph structure, a directed graph, a multigraph structure, a hypergraph structure, or a combination thereof. A multigraph is a graph that is permitted to have multiple edges (also called parallel edges) between any given pair of nodes, i.e., multiple edges may connect the same pair of nodes and two nodes may be connected by more than one edge. A hypergraph is a generalization of a traditional graph in which an edge can connect any number of nodes, i.e., an edge can connect more than two nodes.

As yet another feature, the extensibility of interpretations may also be provided by the graph of operations. In particular, based on an existing interpretation, the graph of operations may include one or more operations represented by nodes beyond just a NULL node. As mentioned previously, selecting a node may be equivalent to reproducing a given stage of the interpretation process. Thus, the current node in the graph of operations represents the current stage. The user, which may include an interpreter or an automated set of instructions, may browse an interpretation session by selecting a node in the graph of operations. The user may be the originator of the interpretation or some other user. This feature is further explained with reference to FIGS. 4A and 4B below.

FIGS. 4A to 4C are flow charts of user interactions for the graph of operations in accordance with exemplary embodiments of the present techniques. The flow charts relate to the user interactions with the various stages. Specifically, the flow chart 400 of FIG. 4A provides the general flow of user interaction, which involves browsing an interpretation session and selecting an intermediate stage. The flow chart 450 of FIG. 4B provides a specific flow during execution of operations, which may be block 406 of the blocks in the flow chart 400. The flow chart 470 of FIG. 4C provides a specific flow of user interaction from the graph of interactions' perspective.

For the flow chart 400, the process begins by obtaining a graph of operations associated with an interpretation session, as shown in block 402. The graph of operations may be obtained by selecting a session currently being performed or completed, or selecting a model, measurement data or other identifying tag for the session. Then, a sequence of operations from the Null node to the selected node may be determined, as shown in block 404. Then the sequence of operations may be executed, as shown in block 406. The execution of the sequence of operations may include starting the session from the selected node. An example of the execution of the sequence of operations is provided in the flow chart 450 of FIG. 4B. Once the sequence of operations is executed, declare the selected node as the last node, as shown in block 408.

For the flow chart 470, the specific flow of user interaction from the graph of interaction perspective, as shown in blocks 472 and 474. At block 472, the operations may be performed. Then, at block 474, the interpretation may be browsed. This flow chart identifies when a new operation is inserted into the graph of operations. The user performs an operation, the graph is updated (e.g., operation inserted), and then the user may decide to inspect the graph or the interpretation (without performing any recordable operations) before proceeding further.

These flow charts 400, 450 and 470 provide examples of a mechanism for a user to interact with the interpretation session in an effective manner. Specifically, the user may decide to add to an interpretation and perform one or more additional operations from any node within the graph of operations. This introduces a new node into the graph of operations as well as a new edge between the selected node and the new node, as noted above. The graph of operations is therefore extended and the new interpretation stage is stored in memory. Previous work remains unaffected and may be accessed in a similar manner as before the extension. Thus, the graph of operations provides a mechanism for reusing part of an interpretation session and providing access to multiple interpretations for simultaneous examination.

In other embodiments, executing another operation creates a new branch or path through the graph. Inserting an additional operation into an existing scenario or interpretation duplicates the graph of operations from the insertion point to the current interpretation, inserts the additional operation at the head of the duplicated path, and add this modified path to the graph of operations at the insertion point. In another embodiment, inserting an additional operation into an existing scenario or interpretation simply links the node with the new operation to its preceding and succeeding operations.

In other embodiments, a specified operation is deleted or removed from a graph of operations. One deletion mechanism is to replace the node of the operation to be deleted with a node for a null operation. Another deletion mechanism is to link the predecessor of the node directly to the successors of the node to be deleted. Deletion may also be accomplished by duplicating the path that contains the operation to be deleted, remove the operation to be deleted from this duplicate path, and add this modified path to the graph of operations.

In another embodiment, in which the graph of operations is not a directed tree, additional interpretation stages may be obtained even without introducing additional operations into the graph of operations. A user may decide to add a new edge and therefore create a number of new paths within the graph of operations. Because each path describes a stage, new stages are thus created. In this embodiment, selecting a path may also be performed automatically, yielding alternate scenarios. That is, a session may be any number of operations, including selecting different branches. It may operate as a work session in which multiple interpretations may be performed.

A scenario is any state of the interpretation process, and so is "interpretation". The term "scenario" may be used interchangeably with the term "interpretation". However, a scenario implies that there is another interpretation to compare. This is only useful if the two interpretations are somehow related. For example, if only a small set of assumptions changes from one interpretation to another (e.g., one horizon is moved up but the remaining horizons stay the same), then this may be referred to as an alternate scenario. In general, many assumptions may change and the resulting interpretations may still be referred to as scenarios. If there is no obvious relation, then they should be referred to as two different interpretations.

In yet another embodiment, interpretations may be created by manipulating the graph of operations. New branches or new paths may be created by selecting a sequence of nodes (operations) that are not connected in the present state of the graph of operations. For example, two interpretations may be performed with each directed to different features (e.g., one of clinoforms and one of faults). Each interpretation may be carried out by a different interpreter and may be described by two different paths. A union of the two interpretations may be created by updating the graph of operations to include a path that links the end of the first interpretation (e.g., the clinoforms) with the beginning of the second interpretation (e.g., the faults).

In addition, the present techniques provide a mechanism for managing multiple interpretation scenarios. As described above, each stage of an interpretation session is defined by a path within the graph of operations. Thus, alternate scenarios are stored by the system and described as paths in the graph of operations. Accordingly, managing the various scenarios, then, is controlled by the information associated with the graph of operations.

The present techniques may include various types of operations. The operations in the graph of operations may be of arbitrary type. The operations are configured to perform some transformation of data (e.g., from one type to another) and/or some operations may include an action that does not modify the data, such as a pause of execution. That is, the system may include operations that involve both types.

One example of an operation is a null operation that performs an identity transformation that simply outputs the inputted data without modification and without any effect other than being inserted into the graph of operations.

One example of an operation is the creation operation. This operation may be utilized to transform an input that is data of one type to an output that is data of another type. For example, the extraction of a horizon from a seismic data volume is one type of creation operation.

Another operation may include a correction operation. This operation may include the input data type and the output data type being of the same type. The correction operation may perform a modification on the data, such as filtering the data etc. As an example, smoothing a seismic data volume is such an operation.

The representation operation is yet another operation. This operation may include outputting data of a different output data type than the input data type. This operation may facilitate a creation operation by providing a more suitable representation of a base type data. For example, a representation operation is any attribute calculation (e.g., label propagation; as noted below) that facilitates the extraction of surfaces from a seismic volume.

A relation operation is another type of operation. This operation translates transformations in one domain to transformations in another domain. For example, the transformation of a seismic horizon in the time domain (e.g., seismic data with samples indexed by time of arrival) to the depth domain (e.g., data with samples indexed by depth from a reference point) is a relation operation.

Visualization operation is yet another operation. This type of operation is associated with the display of the data, but not the data itself. As an example, the selection and rendering of a cross-section through a 3-D seismic amplitude volume is a visualization operation. The rotating, translating and scaling of a rendering are other examples of visualization operations.

Further, a pattern operation is another type of operation. The pattern operation is a special type of compound operation, which is discussed further below. A pattern operation may include several of the operations, which may also include other pattern operations. This operation may be performed in an automated manner, while the others in the list here may involve the user each time they are invoked.

As a further benefit, the present techniques may be utilized to annotate sessions and data associated with the interpretation sessions. With regard to the graph of operations, each of the nodes in the graph of operations may represent an operation. This configuration provides various embodiments that each provide mechanisms for documenting annotations.

In one embodiment, an annotation may be another type of operation. This operation may be followed by any other operation and it may follow any other operation (e.g., an edge between an annotation node and any other node may exist in either direction). Such an operation may have visual drawbacks because it may be displayed as a dummy operation used solely for documentation purposes at a particular stage of the interpretation process. In yet another example, the annotation operation my encode transitions or other visual effects that are visible during an animation sequence. The animation sequence refers to the sequential execution of the operations along a directed path in the graph of operations. Thus, an annotation operation in this context may bring up a textual or pictorial description (e.g., which may be related to a location in the data), may encode a pause with no visible effect, may play an audio file (e.g., narrating a description), and/or may perform any combination of these actions. This type of annotation may be useful for creating presentations directly from an interpretation session, such as learning modules, reviews, etc.

In another embodiment, the annotation may be part of the node, but it is not an operation. The annotation may serve any of the functions noted above in the previous embodiments. However, the annotation may be encoded as a field in the nodes of the graph of operations, rather than as an operation that receives its own node.

In yet another embodiment, annotations may be a combination of the above embodiments. That is, the annotation may be operations and also be a portion of every node. For example, certain types of annotation, such as user name, time and date, may be a portion of each node (e.g., similar to a tag or identification for the node). Other, more specialized annotations, such as a hand drawn diagram or a text associated to a 3-D location, may be operations that modify the interpretation in some informative manner. Other types of operations are discussed further above.

In any of these embodiments, the annotation may comprise different forms. Some annotations may be textual, some may be pictorial, and others may be audible or cause other effects. As an example, one or more geobodies may be selected by a user and the resulting description stored as an annotation. This could be a polygon in two-dimensions (2-D) or an m object in three-dimensions (3-D). More complex annotations may also involve tracking through time or tracking through different types of data. The tracking may be defined in a variety of manners, such as tracking with respect to a prescribed but fixed location in space, and/or tracking all locations where a parameter of some measurable quality of the data (e.g., an amplitude range) satisfies a prescribed condition.

The operation of the graph of operations may be performed in different manners. In one embodiment, real-time interaction with a user may be provided. The operations with the graph of operations are performed to ensure adequate responsiveness (e.g., within seconds or even a fraction of a second). For such an embodiment, two aspects should be considered to perform this embodiment efficiently. First, each operation should be added to the graph of operations in an efficient manner, which should minimize the user's amount of waiting time for each operation performed. That is, each operation should be computed efficiently to lead to preferred workflows for certain tasks and operations. Second, the exploration of various scenarios or recalling work (e.g., both actions that involve the execution of several operations in sequence) should also be performed in an efficient manner. The second aspect may involve the efficient recall of scenarios. This aspect may be provided by the use of a directed graph of operations. As discussed above, scenarios of interpretations may be labeled with a name or otherwise made explicit (e.g., an annotation in the last node of the sequence that describes the scenario). With this type of annotation, useful sequences of operations are clearly marked.

In one embodiment, the state may be computed and explicitly stored after each scenario sequence is executed. With this approach, recalling a scenario involves loading the stored state. This sort of caching may involve large amounts of storage space.

In another embodiment, the graph of operations may include analyzing scenarios. The operations that are computationally expensive may be identified and the stored states limited to only those after the execution of these computationally expensive operations. This method may lessen the storage requirements, while still providing speedy recall because only the computationally cheap operations on the directed path between the state stored last and the desired state need to be reapplied.

In another embodiment, the state may be stored at specified intervals of time, e.g., every 10 minutes, or at specified intervals of executed operations, e.g., after every $50^{th}$ operation.

In yet another embodiment, the state may be stored after the execution of any operation contained in a set of designated operations. This storage may be performed after an operation that is anticipated for recall. The selection of the set of operations provides a mechanism to control and balance the recall speed with available storage. Different strategies for state storage may be combined, for example, the state may be stored after a specified amount of time has passed and an operation contained in the set of designated operations has been executed.

In one or more embodiments, an operation may include vector calculations from seismic data, which may be referred to as a vector calculation operation. This type of operation is representational in that it provides the basis for the representation of an interpretation. The input to the operation is measurements or geophysical data, such as a seismic attribute data volume, seismic data or image. The output is a vector field, which assigns a vector to each location of the input data. This vector (e.g., 2-D or 3-D based on the input data and specifics of the operation) is an estimate of either tangent or normal vectors to events formed by similar scalar values in the input data. The peaks or troughs in a seismic volume may be examples of such events. The vector calculations may involve computing derivatives, components of structure tensors, iso-curves and iso-surfaces and/or ridge tangents and tangent planes. These calculations are further described in U.S. Patent Application Ser. No. 61/740,352, which is entitled "Method and System for Geophysical Modeling of Subsurface Volumes Based on Computed Vectors", and U.S. Patent Application Ser. No. 61/740,353, which is entitled "Method and System for Geophysical Modeling of Subsurface Volumes Based on Computed Vectors", which are each hereby incorporated by reference.

With this embodiment of a representational operation, tensor fields may be efficiently represented. Regardless of how the local structure is initially captured into a tensor field (using the structure tensor or other methods), a representation operation may involve averaging the tensors into a Summed Area Tables (SATs), which averages the field over contiguous rectangular regions for computational efficiency. While the representation operation defines a scale by averaging tensors over a specified rectangular region, the tensors define coordinate systems represented by their eigenvectors and weights (e.g., represented by eigenvalues) associated with each axis. Then, another notion of scale is obtained by averaging tensors in the ellipsoid (or ellipse in 2-D) defined by these coordinate systems. The resulting tensors capture how well nearby measurements agree with the measurements at the center of the coordinate systems. That is, they measures how well the data are represented by a plane (or line in 2-D) passing through the origin.

In other embodiments, the operations may include a label propagation operation. In this operation, surfaces may be extracted from a vector field and a specified seed point by using one of various methods. This operation is a representation operation, which may be referred to as a label propagation operation. The performance of this method is further described in U.S. Patent Application Ser. No. 61/740,358, which is entitled "Method and System for Geophysical Modeling of Subsurface Volumes Based on Label Propagation".

As an example, the label propagation operation propagates the labels from the selected seismic trace to other seismic traces. The input data may be a seismic data set (e.g., 2-D or 3-D data set). The seismic data set may include various seismic traces having a plurality of samples (e.g., location along the trace). A label may be any real number. The samples in the selected trace provide the distribution of labels (e.g., markers, relative age, rock type, impedance values, well log, etc.). The output of the label propagation may include the labeled volume. Beneficially, the label propagation operation may provide a mechanism to perform other operations. Depending on the specifics of the labels pushed from the seed traces, the output may be used in the efficient calculation of horizons, full-volume flattening, calculation of geometric attributes and/or registration of volumes in different domains.

In other embodiments, the operations may include the compute stack of surfaces operation. In this operation, the label volume is obtained through the label propagation operation and describes surfaces within the volume and the output is a stack of surfaces. The stack of surfaces is an implicit representation of the surfaces because the 3-D coordinates of each surface point is computed from the label volume. An alternative to such a representation is to explicitly store surface descriptions, for example a set of surfaces. The performance of this method is further described in U.S. patent application Ser. No. 12/920,013, which is incorporated by reference; U.S. Patent Application Ser. No. 61/740, 358; and Zeng, Hongliu, Henry, S. C., and Riola, J. P., 1998, Stratal slicing, part II: real seismic data: Geophysics, vol. 63, no. 2, p. 514-522.

As an example, a stack of surfaces may be obtained during the label propagation operation. Then, one begins by choosing a granularity (e.g., how many surfaces intersect the initial trace and the label values associated with these surfaces) and allocation of a stack of surfaces or another appropriate data structure to store the chosen number of surfaces spanning a specified region. As the labels are propagated to nearby traces, the z values are stored in memory in the stack of surfaces in the appropriate slots for the specified labels. It is not necessary to maintain the label traces except for immediate neighbors to the front of propagation. In other words, a full label volume does not have to be stored in memory.

As another embodiment, the operations may include a correction to stack of surfaces operation. This operation may be used to correct or modify the surfaces in a particular stack of surfaces. The input to this operation is a stack of surfaces and the output is a corrected stack of surfaces.

As an example, the corrections or modifications may be represented by perturbations to the surface numbers. Suppose that a surface s is to be corrected. Its constituent points may be retrieved by cycling through the possible x and y locations and extracting 3-D points according to (x,y, SoS (x,y,s)). Corrections could be implemented if, instead, the 3-D points were to be extracted according to (x,y, SoS(x,y, s+p(x,y))). The extra term p(x,y) is the perturbation to the surface number s at location (x,y). Thus, the resulting depth values over the surface are picked from one or more different surfaces within the stack of surfaces. A perturbation mapping for each surface s, denoted p(x,y,s) may be defined. The perturbations may be stored in a volume p(x,y,s) of the same size as stack of surfaces. A 3-D point may then be extracted according to (x, y, SoS(x,y, s+p(x,y,s)). In other embodiments, p(x,y,s) may be compressed and not be a full volume.

To obtain p(x,y,s), various methods may be utilized. For example, a user may correct surfaces by picking points on a single surface. If those points do not fall on the same s, then p(x,y,s) is computed such that p(x,y,s)=s(x,y)−s_ref, where s(x,y) is the surface number at the user selected point (x,y,z) and s_ref is a reference surface. In this manner, the user effectively provides a sparse description of p(x,y,s). Interpolation (and extrapolation) between those sparse locations completes the definition of the perturbations. The interpolation/extrapolation schemes may include linear, harmonic (e.g., solution to Laplace's equation), nearest neighbor, etc.

In one or more embodiments, the operations may include a compute multitude of stacks of surfaces operation. As the stacks of surfaces may become very large, it may not be computed efficiently, stored as a single file, and/or properly represent an area of interest. Thus, it is useful to break the task of computing and representing surfaces into a collection of stack of surfaces, which may be referred to as a multitude of stacks of surfaces. The multitude of stacks of surfaces operation functions in the same manner as the stack of surfaces operation, but it incorporates an additional description that defines how surfaces in one stack of surfaces merge with surfaces in adjacent stack of surfaces. This merge is performed by defining pairs of local perturbation maps that only cover the seam between adjacent pairs of stacks of surfaces. The surface curve at the seam may be computed as the average of curves from the corresponding surfaces from each of the stacks of surfaces being combined. Alternatively, the surface curve at the seam may be computed independently (e.g., the label propagation operation may be performed on the seam and produce a local stack of curves).

As an example, a first stack of surfaces SoS1 and a second stack of surfaces SoS2 are combined into a multitude of stacks of surfaces. Each surface in first stack of surfaces SoS1 at the seam is obtained and an appropriate corresponding surface in the second stack of surfaces SoS2 at the seam is also selected. The selection should maintain the ordering relation of the first and second stack of surfaces. Then, a pair of local perturbation maps, one for each of the stack of surfaces, is defined. The computed corresponding pairs of surfaces are combined into a single surface at the seam and the perturbations smoothly revert to the original surfaces as the location moves away from the seam. Thus, if surface s in the second stack of surfaces SoS2 is modified to appear similar to the surface s' from the first stack of surfaces SoS1 at the seam, then the perturbation map smoothly morphs surface s into the curve of surface s' approaching the seam.

In other embodiments, the operations may include a horizon extraction operation. This operation may include various techniques to extract horizons, such as a curve integration for extracting ridge curves technique, a label propagation technique, and/or a surface integration for extracting ridge surfaces technique. The performance of the method is further described in U.S. Patent Application No. 61/740,354, which is entitled "Method and System for Geophysical Modeling of Subsurface Volumes Based on Horizon Extraction", which is incorporated by reference herein. The input data may include a stack of surfaces and/or a label volume, while the output data may include a horizon volume.

As an example, the curve integration for extracting ridge curves technique may be utilized to obtain horizons. The identification of ridge curves that pass through a local maximum may include two computational stages: i) approximation of a tangent field and 2) numerical integration. The first stage may be performed on the data set by computing a vector field and then computing the ridge curves. The second stage may include identifying a seed point and then advancing the point in the tangent direction according to a step size. The process continues until a stopping criterion is satisfied and the sequence of points constitutes an approximation to the ridge curve. In this technique, the approximate tangent field is used to compute a local neighborhood prior to the current point, which is then used to analyze the neighborhood, and select an appropriate tangent vector. Thus, the tangent field is only used as a guide and the resulting curves are not necessarily faithful to the tangent field.

In other embodiments, the operations may include a pattern extraction operation. Within the present operations, a pattern is a special type of operation. It is a compound operation because it may include a sequence of operations and may or may not involve interaction with a user during execution. The inputs can include, but are not limited to, primitives and parameters. The outputs can include, but are not limited to, pattern instances.

The pattern extraction operation may include the use of a pattern language, which is utilized to assist the interpretation of data. The pattern language balances the feature of being formal enough to instruct a computer how to find patterns in data along with the feature of describing patterns in an abstract manner to hide certain technical details. This pattern language may provide a mechanism for technical specialists and non-technical specialists to interact and to define (or refine) pattern definitions and algorithms for use in a pattern recognition interpretation system.

The pattern language provides certain features to enhance the pattern recognition interpretation system. The process may begin by defining what patterns mean within this context and identify specific aspects. These aspects may include i) what patterns are built from, ii) how they are built, and iii) how they may interfere with one another. This definition may be recursive and, as a result, hierarchies of patterns may be based on it. Then, with regard to the second aspect, pattern elements may be obtained at the lowest level of the hierarchy (e.g., the measurements) and how they may be combined. Higher-order patterns are then described and different techniques are used to combine lower-order patterns into larger patterns. As a result, users of a pattern recognition interpretation system based on the proposed language may interact with the patterns at the highest levels of these hierarchies.

As used here, various terms are utilized to define hierarchical patterns and other aspects of the pattern language. For example, a pattern includes sub-patterns collected according to local neighborhood rules in a globally consistent manner.

Primitives, as used herein, mean either original measurements, such as attributes, dips, trends, curve segments, etc., or sub-patterns that are collected by this pattern. The primitives may include curves and seismic horizons. The primitives may be utilized as input data into the pattern extraction operation.

Neighbor relation, as used herein, means a measurement of how primitives can be connected locally. This defines a graph in which nodes are primitives and an edge between nodes exists if the pair of primitives may be collected into a larger object (e.g., line segments along a straight line may be pairwise connected). Collecting primitives into a larger object is represented by some function that transforms two objects into one object. The transformation does not have to be discrete (e.g., two curve segments may be combined into a longer segment (or curve) through spline fitting, interpolation or a high order polynomial fit). Further, any connected subgraph of primitives may be transformed by some function into a larger object. One of the features of the graph is to provide for enumeration of possible configurations. Each potential pattern instance is a connected subgraph.

Global constraints, as used herein, mean conditions that are maintained after the primitives are collected. The neighbor relation graph identifies local affinities, but the final object, an instance of the larger pattern, may include selecting several of the edges and treating the result as a collection of patterns. This larger collection should be consistent according to some global constraints (e.g., a seismic horizon made up of small curve segments does not intersect other seismic horizons in the same data).

Thus, a pattern, as used herein, is a transformation of a collection of sub-patterns into a set of consistent pattern instances, wherein each of which is larger than a primitive sub-pattern. The result of such a transformation is not unique (e.g., a choice in one place may influence the decisions at many other locations, and every choice or selection at a given location may need to be explored). The result, then, is used to generate a number of distinct configurations, each of which is globally consistent and contains larger objects than those in the set of primitives. These candidate configurations include a consistent set of pattern instances.

In this framework, patterns are transformations of the data. Accordingly, the output of a pattern (e.g., a candidate configuration) can be used as the input data from which more patterns are built, which does not have to be part of the same hierarchy. For example, a first pattern Pattern1 may include surfaces with anticlines and a second pattern Pattern2 may include meandering channels on time slices. Then, a third pattern Pattern3 may be defined to include meandering channels on anticlines by using the output of the first pattern Pattern1 as input into the second pattern Pattern2. This example is possible because the input and output types of the patterns utilized are similar. A type system in this pattern language can facilitate error checking as well as guide the specification of patterns.

In other embodiments, the operation may be a picking operation. A picking operation generates an object such as a point, a polyline, a polygon, a surface, a slice, a geobody, or a volume. Specifically, picking operations include surface picking operations, horizon picking operations, and fault picking operations. Picking operations may either be performed by a user, an automated program, or set of instructions.

In other embodiments, the operation may be a modification operation. A modification operation transforms an object such as a point, a polyline, a polygon, a surface, a slice, a geobody, or a volume to another object of the same type. Modification operations may either be performed by a user, an automated program, or set of instructions. Modifications may include addition, deletion, or displacement of picks of points, polylines, polygons, surfaces, slices, geobodies, or volumes.

Further, in one or more embodiments, the present techniques may be utilized to produce hydrocarbons from a subsurface region. This subsurface region may be represented by the vector volume, labeled volume and subsurface model, which may be generated in accordance with the embodiments noted above. For example, a method may include constructing a subsurface model via one or more of the various embodiments above. Then, the subsurface model may be utilized in hydrocarbon management activities to determine locations of resources, access the resources and produce hydrocarbons in a manner know to those skilled in the art. Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or CO2, for example the sequestration of CO2, such as reservoir evaluation, development planning, and reservoir management. In one embodiment, the disclosed methodologies and techniques may be used to extract hydrocarbons from a subsurface region. In such an embodiment, inputs are received from a subsurface model or volume of the subsurface region, where the geologic model has been improved using the methods and aspects disclosed herein. Based at least in part on the subsurface model or volumes, the presence and/or location of hydrocarbons in the subsurface region is predicted. Hydrocarbon extraction may then be conducted to remove hydrocarbons from the subsurface region, which may be accomplished by drilling a well using oil drilling equipment. The equipment and techniques used to drill a well and/or extract the hydrocarbons are well known by those skilled in the relevant art. Other hydrocarbon extraction activities and, more generally, other hydrocarbon management activities, may be performed according to known principles.

Persons skilled in the technical field will readily recognize that in practical applications of the disclosed methodology, it is partially performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming Additionally, the present techniques is in no way limited to implementation in any specific operating system or environment.

As an example, a computer system may be utilized and configured to implement on or more of the present aspects. The computer system may include a plurality of processors; memory in communication with the processors; and a set of instructions stored on the memory and accessible by the processors, wherein the set of instructions, when executed, are configured to: obtain one or more subsurface volumes; perform at least two operations on the subsurface volumes; determine a graph of operations based on each of the at least two operations, wherein the graph of operations includes a description of each of the at least two operations and a flow path for the each of the at least two operations; store the graph of operations, wherein graph of operations is stored in memory as stores the description for the operation in a node and the flow path between two nodes is an edge; identify a specific operation in the graph of operations; and create an additional operation connected to the graph of operations at a node associated with the specific operation to provide an additional branch to the graph of operations. In certain embodiments, the set of instructions may perform the different aspects in the methods noted above or the algorithm noted above.

Figure 6:
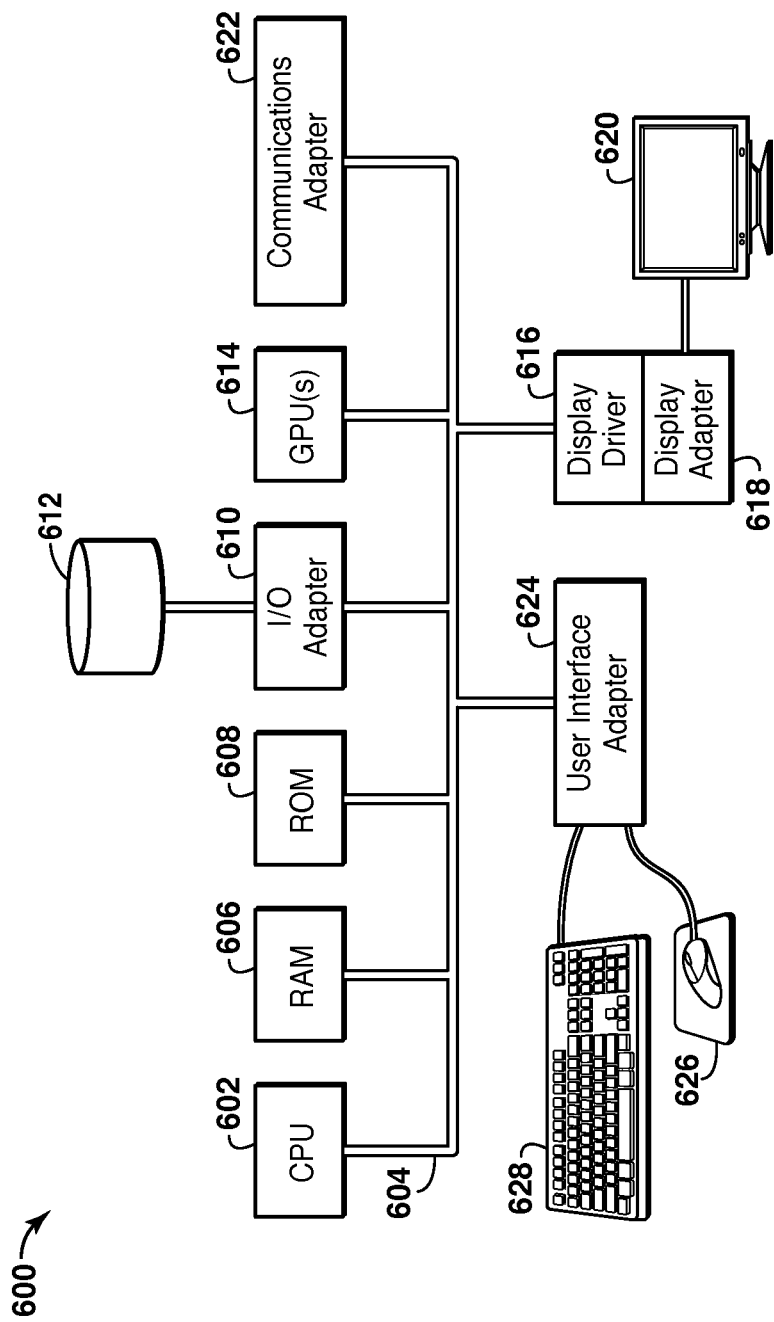
FIG. 6 is a block diagram of an exemplary computing system that may be used in exemplary embodiments of the present techniques.

As an example, the techniques discussed herein may be implemented on a computing device, such as that shown in FIG. 6. FIG. 6 shows an exemplary computer system 600 on which software for performing processing operations of embodiments of the present techniques may be implemented. A central processing unit (CPU) 602 is coupled to a system bus 604. The CPU 602 may be any general-purpose CPU. The present techniques are not restricted by the architecture of CPU 602 (or other components of exemplary system 600) as long as the CPU 602 (and other components of system 600) supports operations according to the techniques described herein.

The CPU 602 may execute the various logical instructions according to the disclosed techniques. For example, the CPU 602 may execute machine-level instructions for performing processing according to the exemplary operational flow described above. As a specific example, the CPU 602 may execute machine-level instructions for performing the methods of FIGS. 1 to 5.

The computer system 600 may also include random access memory (RAM) 606, which may be SRAM, DRAM, SDRAM, or the like. The computer system 600 may include read-only memory (ROM) 608 which may be PROM, EPROM, EEPROM, or the like. The RAM 606 and the ROM 608 hold user and system data and programs, as is well known in the art. The programs may include code stored on the RAM 606 that may be used for modeling geologic properties with homogenized mixed finite elements, in accordance with embodiments of the present techniques.

The computer system 600 may also include an input/output (I/O) adapter 610, a communications adapter 622, a user interface adapter 624, and a display adapter 618. The I/O adapter 610, user interface adapter 624, and/or communications adapter 622 may, in certain embodiments, enable a user to interact with computer system 600 to input information. Further, the computer system 600 may also include a graphical processing unit (GPU(s)) to enhance the graphical processing of the computer system 600.

The I/O adapter 610 may connect the bus 604 to storage device(s) 612, such as one or more of hard drive, compact disc (CD) drive, floppy disk drive, tape drive, flash drives, USB connected storage, etc. to computer system 600. The storage devices may be used when RAM 606 is insufficient for the memory requirements associated with storing data for operations of embodiments of the present techniques. For example, the storage device 612 of computer system 600 may be used for storing such information as computational meshes, intermediate results and combined data sets, and/or other data used or generated in accordance with embodiments of the present techniques.

The communications adapter 622 is adapted to couple the computer system 600 to a network (not shown), which may enable information to be input to and/or output from the system 600 via the network, for example, the Internet or other wide-area network, a local-area network, a public or private switched telephone network, a wireless network, or any combination of the foregoing. The user interface adapter 624 couples user input devices, such as a keyboard 628, a pointing device 626, and a microphone (not shown) and/or output devices, such as speaker(s) (not shown) to computer system 600. The display driver 616 and display adapter 618 are driven by the CPU 602 to control the display on the display device 620, for example, to display information pertaining to a target area under analysis, such as displaying a generated representation of the computational mesh, the reservoir, or the target area, according to certain embodiments.

The present techniques are not limited to the architecture of the computer system 600 shown in FIG. 6. For example, any suitable processor-based device may be utilized for implementing all or a portion of embodiments of the present techniques, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments. In one embodiment of the present techniques, the computer system may be a networked multi-processor system.

One or more of the following embodiments in the following paragraphs may be utilized with the processes, apparatus, and systems, provided above, to prepare a model and/or be utilized to produce hydrocarbons:

A. A method of modeling the subsurface comprising: (a) obtaining one or more subsurface volumes; (b) performing at least two operations on the subsurface volumes; (c) determining a graph of operations based on each of the at least two operations, wherein the graph of operations includes a description of each of the at least two operations and a flow path for the each of the at least two operations; (d) storing the graph of operations, wherein graph of operations is stored in memory as stores the description for the operation in a node and the flow path between two nodes is an edge; (e) identifying a specific operation in the graph of operations; and (f) creating an additional operation connected to the graph of operations at a node associated with the specific operation to provide an additional branch to the graph of operations.

A1. The method recited in paragraph A, wherein the graph of operations is recorded in a form selected from the group consisting of a tree structure, a simple graph structure, a directed graph, a multigraph structure, a hypergraph structure, and a combination thereof.

A2. The method recited in any of paragraphs A to A1, wherein the creation of an additional operation creates a new branch in the graph of operations.

A3. The method recited in any of paragraphs A to A2 further comprising inserting an operation into an existing graph by duplicating the graph at an insertion point and inserting said operation into one of the duplicate graphs.

A4. The method recited in any of paragraphs A to A3 further comprising inserting an operation into an existing graph by linking the operation with edges to the preceding and succeeding operations.

A5. The method recited in any of paragraphs A to A4 further comprising deleting an operation from an existing graph.

A6. The method recited in paragraph A5, wherein deleting an operation from an existing graph is done by creating a path through the graph without said operation while preserving a path through the graph with said operation.

A7. The method recited in any of paragraphs A5 to A6, wherein deleting an operation replaces said operation with a null operation.

A8. The method recited in any of paragraphs A5 to A7, wherein deleting an operation deletes the node of said operation and links its predecessor to its successor with an edge.

A9. The method recited in any of paragraphs A5 to A8, wherein deleting an operation inserts a duplicate branch of the graph from which said operation has been removed.

A10. The method recited in any of paragraphs A to A9, wherein the operation is selected from the group consisting of a null operation, a annotation, a label or tag, a display operation, a display modification, and an animation operation.

A11. The method recited in any of paragraphs A to A10, wherein the operation is picking an object selected from the group consisting of a point, a polyline or a polygon, a surface, geobody, and a volume.

A12. The method recited in any of paragraphs A to A11, wherein the operation includes one of surface picking, horizon picking or fault picking.

A13. The method recited in any of paragraphs A to A12, wherein the operation includes label propagation.

A14. The method recited in any of paragraphs A to A13, wherein the operation includes modification of an object selected from the group consisting of point, polyline or polygon, surface, geobody and a volume.

A15. The method recited in any of paragraphs A to A14, wherein the operations are performed in at least one display window.

A16. The method recited in any of paragraphs A to A15, wherein the operations are performed on objects selected from the group consisting of polylines, slices, horizons, maps, volumes, and combinations thereof.

A17. The method recited in any of paragraphs A to A16, wherein the operations are performed in menus, banners, icons, popup windows, or apps.

A18. The method recited in any of paragraphs A to A17, wherein the operations are inputted using a keyboard, a mouse, a touchpad, or a motion sensing device.

A19. The method recited in any of paragraphs A to A18, wherein the operations performed on the graph are inserted into the graph.

A20. The method recited in any of paragraphs A to A19, wherein the operations performed on the graph are selected from the group consisting of include searching for specified operations, searching for specified states, and searching for specified results.

A21. The method recited in any of paragraphs A to A20 further comprising storing specified intermediate states of the interpretation.

A22. The method recited in any of paragraphs A to A21 further comprising storing intermediate states of the interpretation at user specified points of the interpretation.

A23. The method recited in any of paragraphs A to A22 further comprising storing intermediate states of the interpretation at specified time intervals.

A24. The method recited in any of paragraphs A to A23 further comprising storing intermediate states of the interpretation after a specified number of graph modifications.

A25. The method recited in any of paragraphs A to A24 further comprising storing intermediate states of the interpretation when the graph exceeds a specified amount of complexity such as a specified number of predecessors or successors to a node.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

The invention claimed is:

1. A method of modeling a subsurface comprising:
(a) obtaining one or more subsurface volumes of geophysical data, and preparing the geophysical data for interpretation, including extracting one or more horizons from the geophysical data;
(b) generating an interpretation by performing at least two interpretation operations on the geophysical data prepared for interpretation, wherein the at least two interpretation operations include at least a pattern extraction operation, which includes a computer searching for a pattern in the geophysical data, and a geologic concept application operation, which includes applying a geologic rule that defines truncation modalities for horizons;
(c) determining a graph of operations to track the at least two interpretation operations, wherein the graph of operations includes a description of each of the at least two interpretation operations and a flow path for the each of the at least two interpretation operations;
(d) storing the graph of operations in a computer memory, wherein the description for each of the at least two interpretation operations is respectively stored in at least two nodes of the graph of operations and the flow path between the at least two nodes is an edge;
(e) identifying a specific operation, from among the at least two interpretation operations, in the graph of operations;
(f) creating an additional operation connected to the graph of operations at one of the at least two nodes that is associated with the specific operation to provide an additional edge to the graph of operations;
(g) modifying, with a computer, at least one of the at least two interpretation operations and using the graph of operations to track and recover a corresponding state of the interpretation and propagating the modification through the interpretation;
(h) generating a subsurface model from the interpretation, wherein the subsurface model is associated with the graph of operations; and
(i) prospecting for or causing hydrocarbons to be extracted at or from locations in the subsurface determined from the subsurface model.

2. The method of claim 1, wherein the graph of operations is recorded in a form including a tree structure, a simple graph structure, a directed graph, a multigraph structure, a hypergraph structure, or a combination thereof.

3. The method of claim 1, wherein the creating the additional operation includes duplicating the graph of operations at an insertion point and inserting said additional operation into the duplicate graph of operations.

4. The method of claim 1, wherein the creating the additional operation includes linking the additional operation with edges to preceding and succeeding operations.

5. The method of claim 1 further comprising deleting an operation amongst the at least two interpretation operations from the graph of operations.

6. The method of claim 5, wherein the deleting includes creating a path through the graph of operations without said operation to be deleted.

7. The method of claim 5, wherein the deleting includes replacing said operation to be deleted with a null operation.

8. The method of claim 5, wherein the deleting includes deleting a node of said operation to be deleted and linking its predecessor node to its successor node with an edge.

9. The method of claim 5, wherein the deleting includes inserting a duplicate portion of the graph of operations from which said operation to be deleted has been removed.

10. The method of claim 1, wherein the graph of operations includes at least one of a null operation, an annotation, a label or tag, a display operation, a display modification, and an animation operation.

11. The method of claim 1, wherein the graph of operations includes an operation, amongst the at least two interpretation operations, that includes picking a point, a polyline or a polygon, a surface, a geobody, or a volume.

12. The method of claim 1, wherein the graph of operations includes an operation, amongst the at least two interpretation operations, that includes surface picking, horizon picking or fault picking.

13. The method of claim 1, wherein the graph of operations includes an operation, amongst the at least two interpretation operations, that includes label propagation.

14. The method of claim 1, wherein the graph of operations includes an operation, amongst the at least two interpretation operations, that includes modification of an object that includes a point, polyline or polygon, surface, geobody or a volume.

15. The method of claim 1, further comprising performing at least one of the at least two interpretation operations in at least one display window.

16. The method of claim 1, further comprising performing at least one of the at least two interpretation operations on objects including polylines, slices, horizons, maps, volumes, or combinations thereof.

17. The method of claim 1, further comprising performing at least one of the at least two interpretation operations in menus, banners, icons, popup windows, or apps.

18. The method of claim 1, further comprising inputting at least one of the at least two interpretation operations using a keyboard, a mouse, a touchpad, or a motion sensing device.

19. The method of claim 1, further comprising searching for specified operations, searching for specified states, or searching for specified results, which are additionally included in the performing of the at least two interpretation operations.

20. The method of claim 1 further comprising storing intermediate states of the interpretation at user specified points of the interpretation.

21. The method of claim 1 further comprising storing intermediate states of the interpretation at specified time intervals.

22. The method of claim 1 further comprising storing intermediate states of the interpretation after a specified number of modifications to the graph of operations.

23. The method of claim 1 further comprising storing intermediate states of the interpretation when the graph of operations exceeds a specified number of predecessors or successors to a node.

24. The method of claim 1, further comprising a second interpretation of the same geophysical data by manipulating the graph of operations.

25. The method of claim 1, further comprising creating a second interpretation of the geophysical data by manipulating the graph of operations.

26. The method of claim 1, further comprising performing the at least two interpretation operations on the data prepared for interpretation, wherein the at least two interpretation operations are linked in a dynamic manner, such that modifications propagate through the data prepared for interpretation, and modifying one object automatically perturbs neighboring objects.

* * * * *